United States Patent
Lee et al.

(10) Patent No.: US 10,772,049 B2
(45) Date of Patent: Sep. 8, 2020

(54) METHOD FOR TERMINAL FOR REPORTING POWER HEADROOM IN WIRELESS COMMUNICATION SYSTEM, AND TERMINAL UTILIZING METHOD

(71) Applicant: LG Electronics Inc., Seoul (KR)

(72) Inventors: Seungmin Lee, Seoul (KR); Suckchel Yang, Seoul (KR); Daesung Hwang, Seoul (KR); Kijun Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/322,668

(22) PCT Filed: Aug. 3, 2017

(86) PCT No.: PCT/KR2017/008416
§ 371 (c)(1),
(2) Date: Feb. 1, 2019

(87) PCT Pub. No.: WO2018/026223
PCT Pub. Date: Feb. 8, 2018

(65) Prior Publication Data
US 2019/0387483 A1    Dec. 19, 2019

Related U.S. Application Data

(60) Provisional application No. 62/370,699, filed on Aug. 3, 2016.

(51) Int. Cl.
*H04W 52/36*    (2009.01)
*H04W 52/42*    (2009.01)

(52) U.S. Cl.
CPC .......... *H04W 52/36* (2013.01); *H04W 52/42* (2013.01)

(58) Field of Classification Search
CPC .............................. H04W 52/36; H04W 52/42
See application file for complete search history.

(56) References Cited

U.S. PATENT DOCUMENTS

| | | |
|---|---|---|
| 9,125,070 B2 | 9/2015 | Kim et al. |
| 2012/0189075 A1 | 7/2012 | Wang et al. |
| 2013/0208704 A1 | 8/2013 | Hultell |
| 2017/0026938 A1* | 1/2017 | Onggosanusi ........ H04L 5/0051 |
| 2017/0195998 A1* | 7/2017 | Zhang .................... H04B 7/086 |
| 2017/0339645 A1* | 11/2017 | Jeong .................. H04W 52/325 |
| 2018/0034515 A1* | 2/2018 | Guo .................... H04B 7/0404 |

FOREIGN PATENT DOCUMENTS

WO    2016044994    3/2016

OTHER PUBLICATIONS

"3GPP, TSG RAN: Evolved Universal Terrestrial Radio Access (E-UTRA): Medium Access Control (MAC) Protocol Specification (Release 13)," 3GPP TS 36.321 V13.2.0, Jul. 7, 2016, see section 5.4.6.

* cited by examiner

*Primary Examiner* — Kyaw Z Soe
(74) *Attorney, Agent, or Firm* — Dentons US LLP

(57) ABSTRACT

The present invention provides a method, carried out by a terminal, for reporting power headroom in a wireless communication system, the method determining whether power headroom information, linked to one or more analog beams, is to be transmitted, and, on the basis of the determination, transmitting the power headroom information, wherein when the power headroom information is transmitted, the terminal also transmits information for differentiating one or more analog beams.

9 Claims, 20 Drawing Sheets

: DM-RS  : PCRS for port 0

FIG. 15

| C$_7$ | C$_6$ | C$_5$ | C$_4$ | C$_3$ | C$_2$ | C$_1$ | R |
|---|---|---|---|---|---|---|---|
| P | V | \multicolumn{6}{c}{PH (Type 2, PCell)} |
| R | R | \multicolumn{6}{c}{P$_{CMAX,c}$ 1} |
| P | V | \multicolumn{6}{c}{PH (Type 1, PCell)} |
| R | R | \multicolumn{6}{c}{P$_{CMAX,c}$ 2} |
| P | V | \multicolumn{6}{c}{PH (Type 1, SCell 1)} |
| R | R | \multicolumn{6}{c}{P$_{CMAX,c}$ 3} |

. . .

| P | V | PH (Type 1, SCell n) |
|---|---|---|
| R | R | P$_{CMAX,c}$ m |

METHOD FOR TERMINAL FOR REPORTING POWER HEADROOM IN WIRELESS COMMUNICATION SYSTEM, AND TERMINAL UTILIZING METHOD

CROSS-REFERENCE TO RELATED APPLICATIONS

This application is the National Stage filing under 35 U.S.C. 371 of International Application No. PCT/KR2017/008416, filed on Aug. 3, 2017, which claims the benefit of U.S. Provisional Application No. 62/370,699 filed on Aug. 3, 2016, the contents of which are all hereby incorporated by reference herein in their entirety.

BACKGROUND OF THE INVENTION

Field of the Invention

The present invention relates to wireless communication, and more particularly, to a method for power headroom reporting performed by a terminal in a wireless communication system and a terminal using the method.

Related Art

In the International Telecommunication Union Radio Communication Sector (ITU-R), standardization of International Mobile Telecommunication (IMT)-Advanced, a next generation mobile communication system after 3rd generation, is underway. IMT-Advanced aims to support IP (Internet Protocol) based multimedia service at data rates of 1 Gbps in a stationary and low-speed moving state and 100 Mbps in a high-speed moving state.

The 3rd Generation Partnership Project (3GPP) is a system standard that meets the requirements of IMT-Advanced, and LTE-Advanced (LTE-A), which has improved Long Term Evolution (LTE) based on Orthogonal Frequency Division Multiple Access (OFDMA)/Single Carrier-LTE-Advanced (LTE-A), is being prepared. LTE-A is one of the strong candidates for IMT-Advanced.

As communication devices increasingly require larger communication capacity, a need for improved mobile broadband communication over existing radio access technology (RAT) has emerged. Also, massive machine type communications (MTC), which provides various services anywhere and any time by connecting multiple devices and objects, is one of the major issues to be considered in next generation communication. In addition, communication system design considering service/UE sensitive to reliability and latency is under discussion, and in the next generation communication, communication considering analog beam, as well as digital beam, is considered.

The parameters related to power control are specific to the above-described analog beams. That is, parameters related to power control may be determined according to analog beams, and parameters related to power control for a particular analog beam may be distinguished from parameters related to power control for other analog beams.

Since parameters related to power control are analog beam-specific and power headroom reporting is also related to power control, power headroom reporting transmission may also be performed analogue beam-specifically. Here, when the terminal performs transmission of power headroom reporting in an analog beam-specific manner, how to distinguish transmission of power headroom reporting performed by the terminal in an analog beam-specific manner may be problematic.

Thus, the present invention provides a method of transmitting information for identifying a specific analog beam, as well as corresponding power headroom information, when a terminal performs power headroom reporting associated with the specific analog beam.

In addition, when there are multiple power headroom reporting objects associated with a specific analog beam, it may be problematic on which criteria the terminal will perform power headroom reporting associated with the specific analog beam. In other words, when the terminal has a plurality of headroom reports to be transmitted in relation to a specific analog beam, it may be problematic to transmit all the headroom reports in that overhead increases excessively.

Thus, the present invention provides based on which criteria a terminal is to perform power headroom reporting associated with a specific analog beam.

SUMMARY OF THE INVENTION

The present invention provides a power headroom reporting method performed by a terminal in a wireless communication system and a terminal using the same.

In an aspect, a method for power headroom reporting performed by a user equipment (UE) in a wireless communication system is provided. The method may comprise determining whether to transmit power headroom information related to at least one analog beam and transmitting the power headroom information on the basis of the determination. When transmitting the power headroom information, the UE may transmit information for identifying the at least one analog beam together.

When transmitting the power headroom information, the UE may transmit information on a maximum transmission power value allowed for the at least one analog beam together.

The method may further comprise receiving information indicating the number of pieces of simultaneously reported power headroom information.

When the UE simultaneously transmits pieces of the power headroom information respectively related to a plurality of analog beams, the UE may transmit some of pieces of the power headroom information respectively related to the plurality of analog beams on the basis of the information indicating the number of pieces of the simultaneously reported power headroom information.

Some of pieces of the power headroom information may be determined on the basis of information for identifying the plurality of analog beams.

Some of pieces of the power headroom information may include only pieces of the power headroom information transmitted when uplink channel transmission is actually performed.

When the number of pieces of the power headroom information respectively related to the plurality of analog beams is greater than the number indicated by the information indicating the number of pieces of simultaneously transmitted power headroom information, the UE may transmit the some of pieces of the power headroom information.

When the UE simultaneously transmits the pieces of the power headroom information respectively related to the plurality of analog beams, a quantization step size of power headroom information related to a specific analog beam among the plurality of analog beams may be different from a quantization step size of power headroom information related to another analog beam among the plurality of analog beams.

When an analog beam list is changed, the UE may transmit power headroom information related to the at least one analog beam.

The power headroom information may be power headroom information transmitted when uplink channel transmission is actually performed or power headroom information transmitted when uplink channel transmission is not actually performed.

In another aspect, a user equipment is provided. The user equipment may comprise a radio frequency (RF) unit transmitting and receiving a wireless signal and a processor connected to the RF unit to operate. The processor may determine whether to transmit power headroom information related to at least one analog beam, transmit the power headroom information on the basis of the determination, and when transmitting the power headroom information, the UE may transmit information for identifying the at least one analog beam together.

According to the present invention, when a terminal performs power headroom reporting related to a specific analog beam, it may transmit information for identifying the specific analog beam, as well as corresponding power headroom information. Accordingly, a base station, which receives the identification information may clearly know an analog beam associated with the power headroom information transmitted from the terminal, and thus, wireless communication efficiency may be increased.

In addition, the present invention provides based on which criteria a terminal should perform power headroom reporting associated with a specific analog beam. Specifically, when the terminal has a plurality of headroom reports to be transmitted in relation to a specific analog beam, the terminal transmits only some of the headroom reports, rather than all the headroom reports, and thus, packet overhead may be reduced to maximize wireless communication efficiency.

BRIEF DESCRIPTION OF THE DRAWINGS

FIG. 15 illustrates an example of an extended power headroom MAC control element.

DESCRIPTION OF EXEMPLARY EMBODIMENTS

Figure 1:
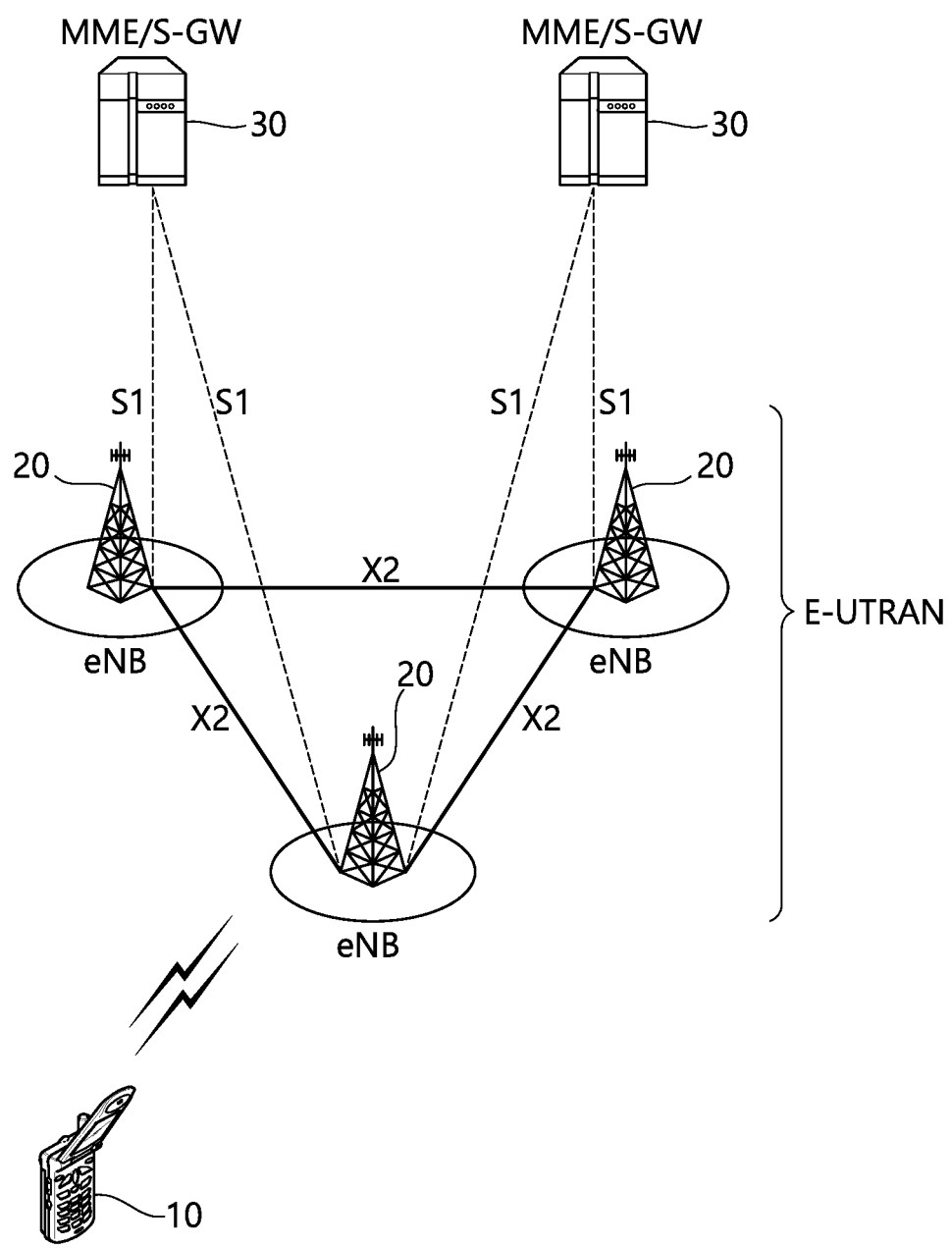
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
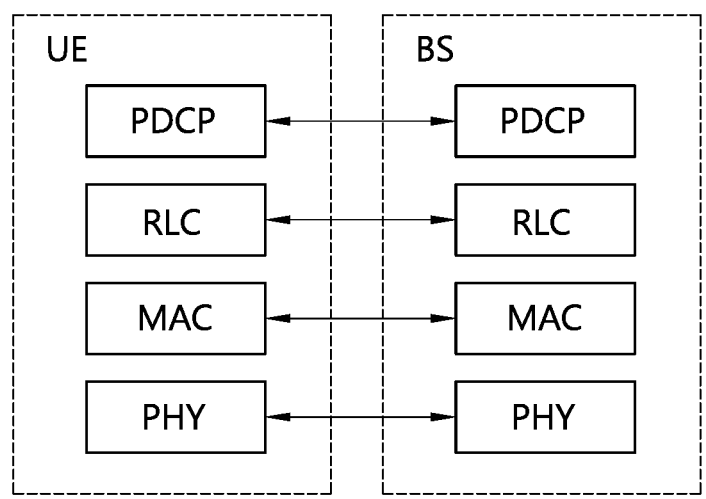
FIG. 2 is a diagram showing a wireless protocol architecture for a user plane.
Figure 3:
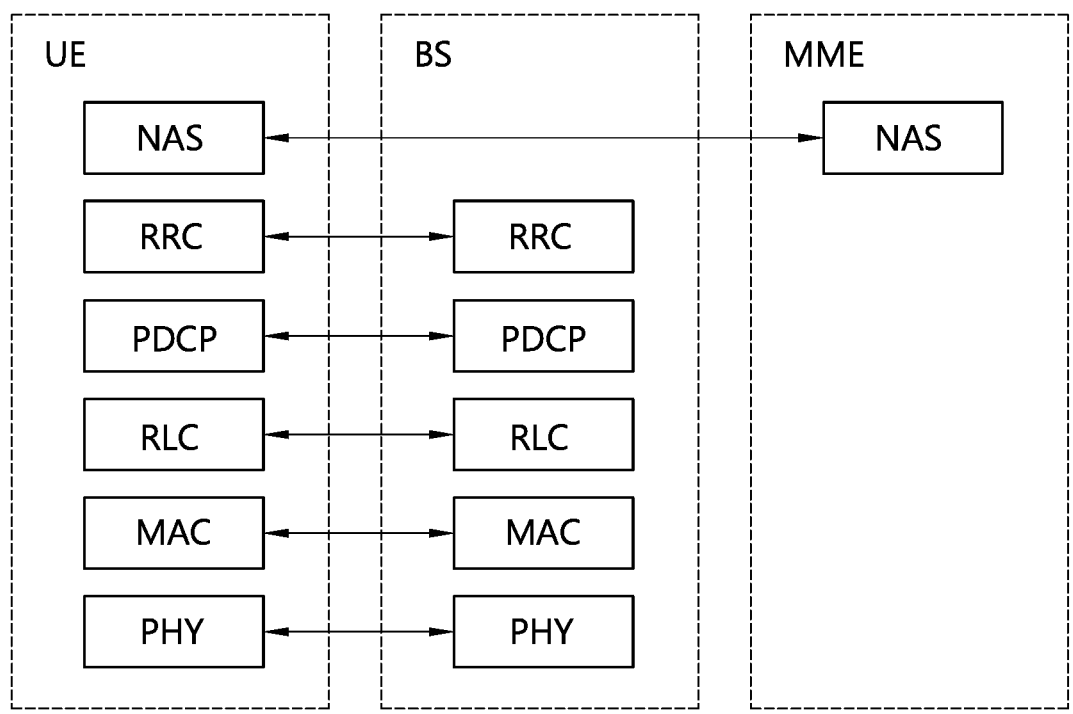
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode:

Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT) will be described.

As communication devices increasingly require larger communication capacity, a need for improved mobile broadband communication over existing radio access technology (RAT) has emerged. Also, massive machine type communications (MTC), which provides various services anywhere and any time by connecting multiple devices and objects, is one of the major issues to be considered in next generation communication. In addition, communication system design considering service/UE sensitive to reliability and latency is under discussion. The introduction of next generation radio access technology considering enhanced mobile broadband communication, massive MTC, ultra-reliable and low latency communication (URLLC), and the like, is under discussion, and in the present invention, the corresponding technology is called a new RAT. Hereinafter, technologies applied to the new RAT will be additionally described.

<Self-Contained Subframe Structure>

Figure 4:
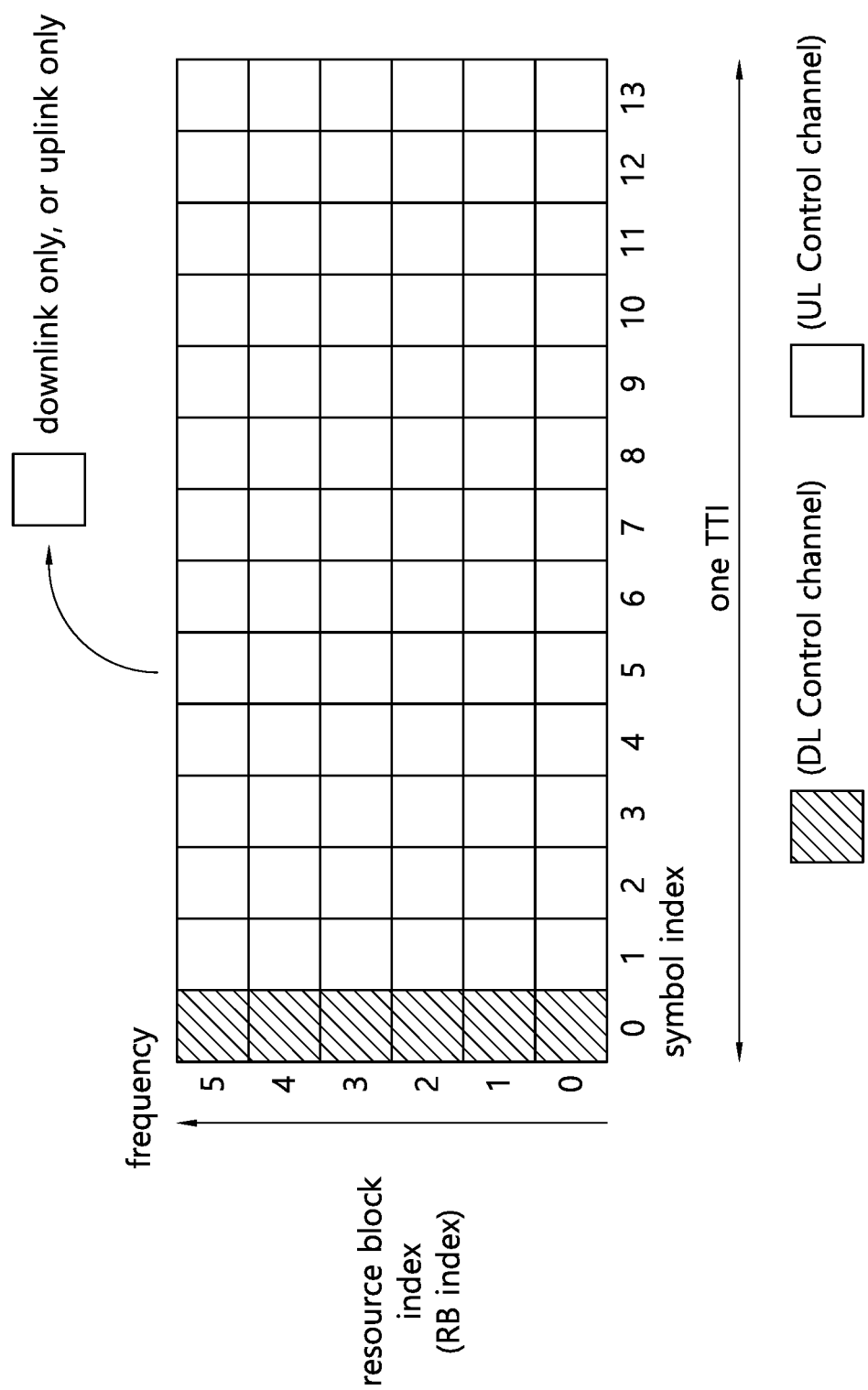
FIG. 4 schematically illustrates an example of a frame structure for a new RAT.

FIG. 4 schematically illustrates an example of a frame structure for a new RAT.

In order to minimize latency in the $5^{th}$-generation new RAT, a structure in which a control channel and a data channel are TDM-ed as illustrated in FIG. 4 may be considered as one of frame structures.

In FIG. 4, the shaded area represents a downlink control region, and the black area represents an uplink control region. The unmarked region may be used for downlink (DL) data transmission or uplink (UL) data transmission. This structure features that DL transmission and UL transmission are sequentially performed in one subframe so DL data may be transmitted and UL ACK/NACK may be received in the subframe. As a result, time taken for retransmit the data when a data transmission error occurs, thereby minimizing latency of transmission of final data.

In the self-contained subframe structure, a time gap is required for a process in which the BS and the UE is switched from a transmission mode to a reception mode or from a reception mode to a transmission mode. To this end, in the self-contained subframe structure, some OFDM symbols at a time point when DL is switched to UL are set to a guard period (GP).

<Analog Beamforming #1>

In the millimeter wave (mmW), a wavelength is shortened so that a plurality of antenna elements may be installed in the same area. That is, a total of 64 (8×8) antenna elements may be installed in a 2-dimension array at 0.5 lambda (wavelength) intervals on a 4 by 4 cm panel with a wavelength of 1 cm at a 30 GHz band. Therefore, in the mmW, a beamforming (BF) gain is increased using a plurality of antenna elements to increase coverage or throughput.

In this case, if each antenna element has a transceiver unit (TXRU) such that transmission power and phase adjustment are adjustable, independent beamforming may be performed for each frequency resource. However, installing the TXRU on all 100 antenna elements has a problem in terms of cost effectiveness. Therefore, a method of mapping a plurality of antenna elements to one TXRU and adjusting a direction of a beam by an analog phase shifter is considered. Such an analog beamforming method has a disadvantage in that it may make only one beam direction in the entire bands and cannot perform frequency selective beamforming.

Hybrid beamforming (hybrid BF) with B TXRUs that are fewer than Q antenna elements as an intermediate form between digital beamforming (Digital BF) and analog beamforming (analog BF) may be considered. In this case, although there is a difference according to connection methods of B TXRU and Q antenna elements, the number of beams that may be transmitted at the same time is limited to B or less.

Figure 5:
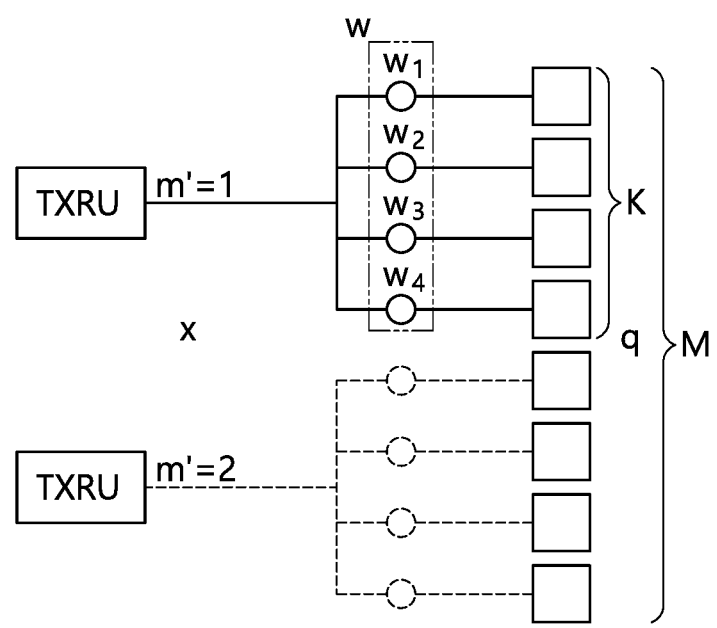
FIGS. 5 and 6 illustrate examples of a connection method of TXRUs and antenna elements.
Figure 6:
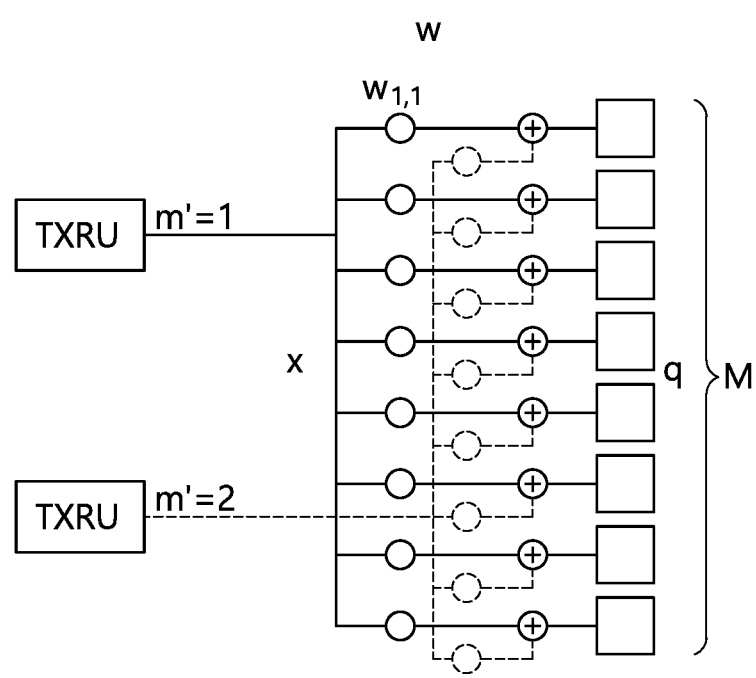

FIGS. 5 and 6 illustrate examples of a connection method of TXRUs and antenna elements.

Here, the TXRU virtualization model represents a relationship between output signals of the TXRUs and output signals of the antenna elements.

FIG. 5 illustrates a scheme in which a TXRU is connected to a sub-array. In this case, the antenna elements are connected to only one TXRU. FIG. 6 illustrates a scheme in which the TXRUs are connected to all the antenna elements. In this case, the antenna elements are connected to all TXRUs. In the figure, W represents a phase vector multiplied by an analog phase shifter. That is, a direction of the analog beamforming is determined by W. Here, mapping between the CSI-RS antenna ports and the TXRUs may be 1-to-1 or 1-to-many.

<Analog Beamforming #2>

A hybrid beamforming technique which combines digital beamforming and analog beamforming in the case of using multiple antennas has emerged. Here, analog beamforming (or RF beamforming) refers to an operation of performing precoding (or combining) in an RF end. In the hybrid beamforming, a baseband end and the RF end each perform precoding (or combining), so that performance close to digital beamforming may be obtained, while the number of RF chains and D/A (or A/D) converters is reduced. For the sake of convenience, the hybrid beamforming structure may be represented by N transceiver units (TXRU) and M physical antennas. Digital beamforming for L data layers to be transmitted at a transmission end may be represented by an N by L matrix, and N subsequently converted digital signals are converted through the TXRU to analog signals, and thereafter, analog beamforming represented by M by N matrix is applied.

Figure 7:
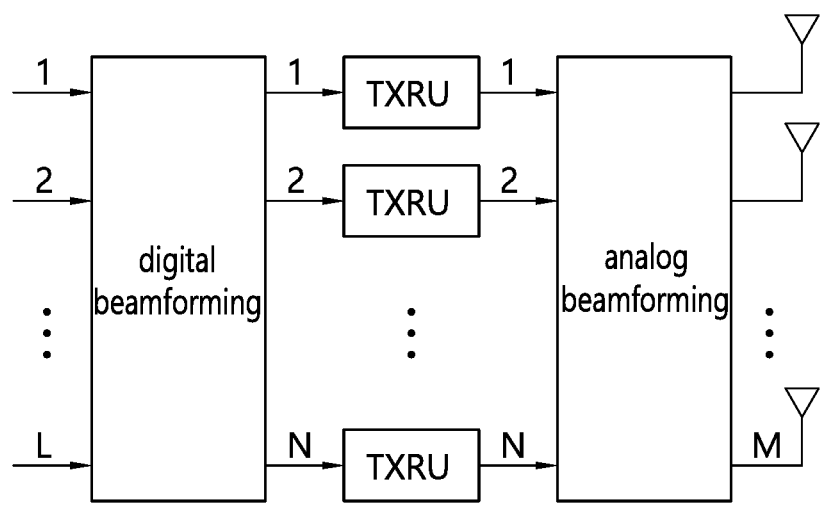
FIG. 7 is a view abstractly schematizing a hybrid beamforming structure in view of the TXRU and physical antennas.

FIG. 7 is a view abstractly schematizing a hybrid beamforming structure in view of the TXRU and physical antennas.

In FIG. 7, the number of digital beams is L and the number of analog beams is N. Further, in the new RAT system, it is considered that a BS is designed to change analog beamforming in units of symbols to support more efficient beamforming for a UE located in a specific area. In addition, in the new RAT system, even a scheme of introducing multiple antenna panels to which independently hybrid beamforming is applicable, when N TXRUs and M RF antennas are defined as one antenna panel in FIG. 7, is also considered.

When the BS utilizes a plurality of analog beams as described above, an analog beam advantageous for signal reception may be different for each UE, and thus, a beam sweeping operation in which the BS changes a plurality of analog beams to be supplied for each symbols in a specific subframe so that all the UEs may have a reception opportunity is considered.

Figure 8:
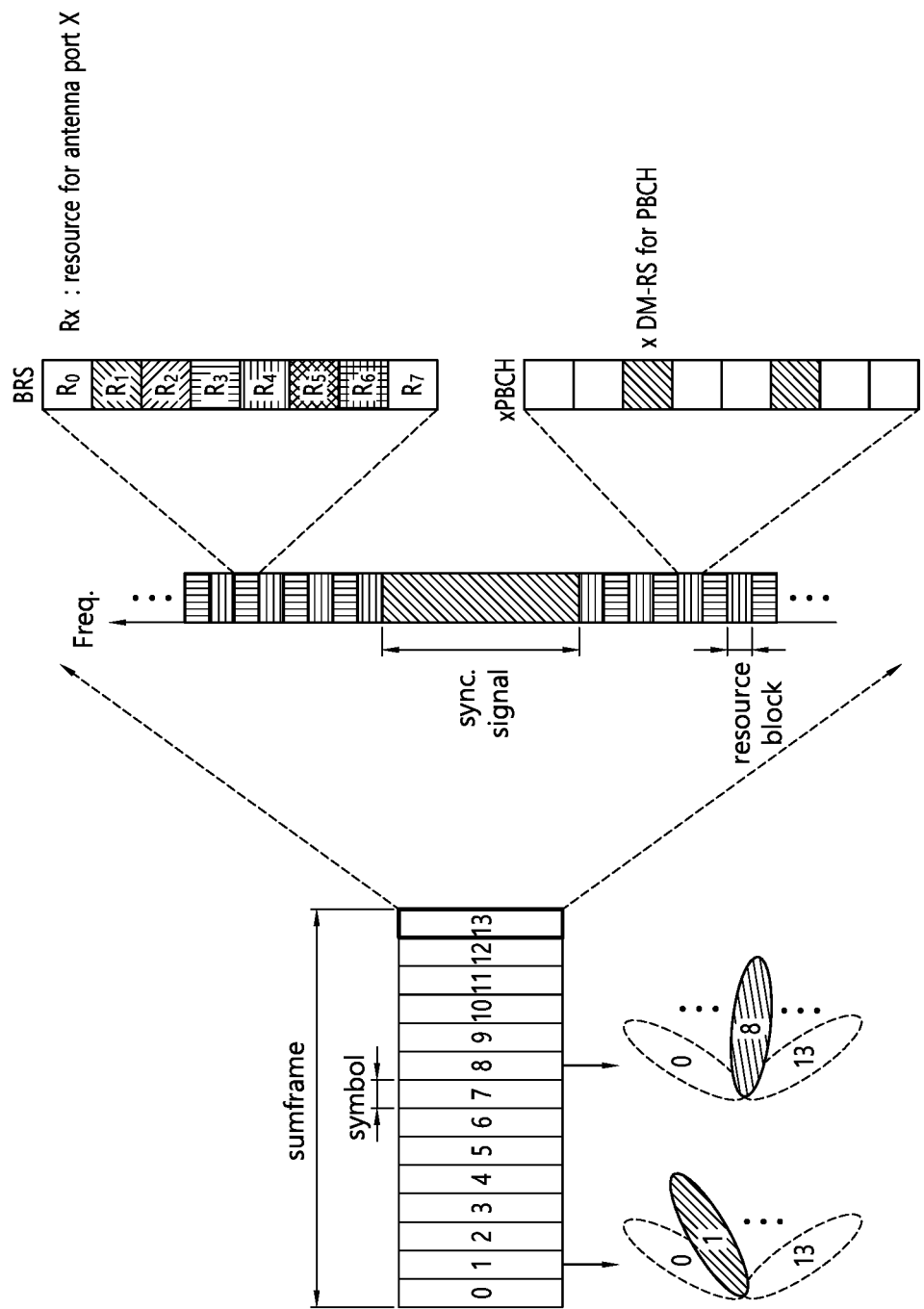
FIG. 8 is a view schematizing the beam sweeping operation for a synchronization signal and system information during a downlink (DL) transmission process.

FIG. 8 is a view schematizing the beam sweeping operation for a synchronization signal and system information during a downlink (DL) transmission process.

In FIG. 8, a physical resource (or a physical channel) in which system information of a new RAT system is transmitted in a broadcasting manner is referred to as an xPBCH (physical broadcast channel). Here, analog beams belonging to different antenna panels may be simultaneously transmitted within one symbol. In order to measure a channel for each analog beam, as illustrated in FIG. 8, a scheme of introducing a beam RS (BRS), which is a reference signal (RS) to which a single analog beam (corresponding to a specific antenna) is applied and transmitted, is under discussion. The BRS may be defined for a plurality of antenna ports, and each antenna port of the BRS may correspond to a single analog beam. Here, unlike the BRS, all the analog beams of an analog beam group may be applied to the synchronization signal or the xPBCH and transmitted so that a certain UE may receive the synchronization signal or xPBCH.

<Panel Array Antenna>

Figure 9:
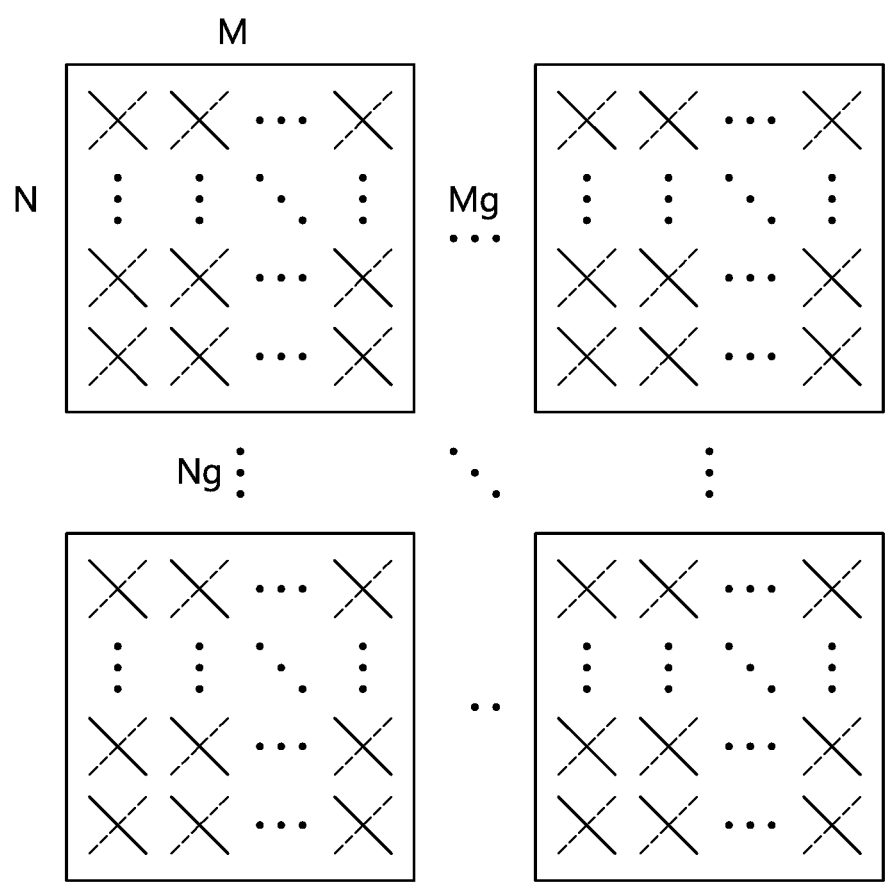
FIG. 9 schematically illustrates an example of a panel antenna array.

FIG. 9 schematically illustrates an example of a panel antenna array.

Referring to FIG. 9, it is assumed that a generalized panel antenna array of FIG. 9 includes Mg and Ng panels in a horizontal domain and a vertical domain, respectively, a single panel includes M rows and N rows, and an X-pol antenna is assumed. Therefore, a total number of antenna elements is 2*M*N*Mg*Ng.

<Feedback of Channel State Information (CSI)>

In a 3GPP LTE (-A) system, a user equipment (UE) is defined to report channel state information (CSI) to a BS, and channel state information (CSI) refers to information indicating quality of a wireless channel (or link) formed between a UE and an antenna port.

For example, a rank indicator (RI), a precoding matrix indicator (PMI), a channel quality indicator (CQI), and the like correspond thereto. Here, RI denotes rank information of a channel and refers to the number of streams that the UE receives through the same time-frequency resource. Since this value is determined to be dependent on long term fading of a channel, the RI generally has a period longer than that of the PMI and CSI and is fed back from the UE to the BS. The PMI is a value reflecting channel space characteristics and indicates a preferred precoding index of the UE on the basis of a metric such as SINR. The CQI is a value representing strength of a channel and generally refers to a reception SINR that may be obtained when the BS uses the PMI.

In the 3GPP LTE (-A) system, the BS may set a plurality of CSI processes for a UE and may be reported CSI for each process. Here, the CSI process includes CSI-RS for signal quality measurement from the BS and CSI-interference measurement (CSI-IM) resource for interference measurement.

<Virtualization of Reference Signal (RS)>

A physical downlink shared channel (PDSCH) may be transmitted only in one analog beam direction at a time point by analog beamforming at mmW. Therefore, data may be transmitted from the BS only to a small number of UEs present in the corresponding direction. Therefore, by setting different directions of the analog beam for each antenna port as necessary, data may be simultaneously transmitted to a plurality of UEs in the directions of the analog beam.

Figure 10:
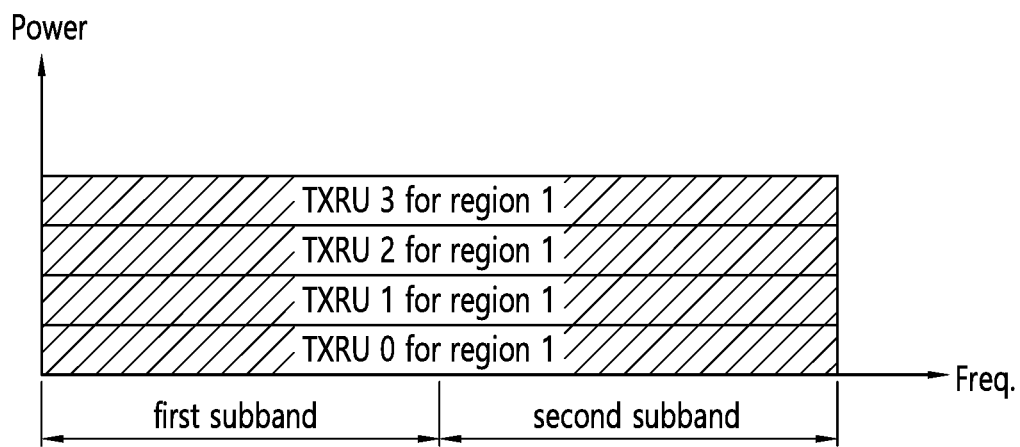
FIG. 10 schematically illustrates an example of a service region for each TXRU when all TXRUs have the same analog beamforming direction.
Figure 11:
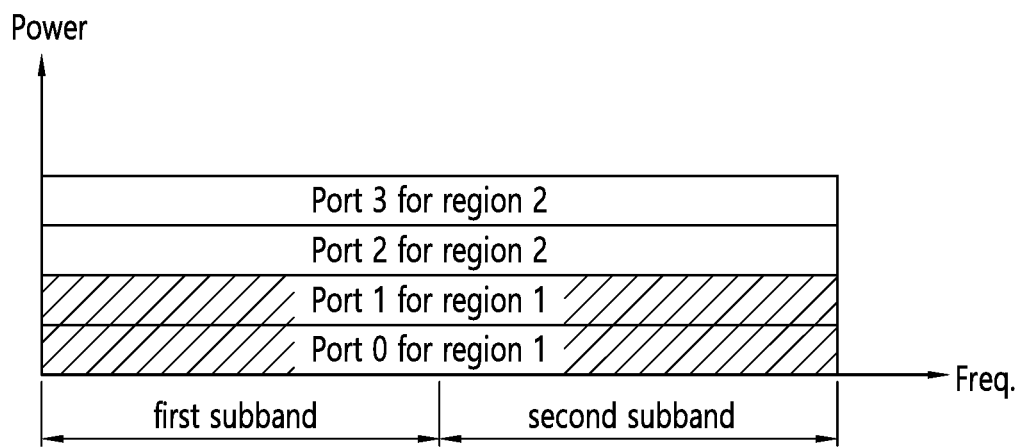
FIG. 11 schematically illustrates an example of a service region for each TXRU when each TXRU has different analog beamforming directions.
Figure 12:
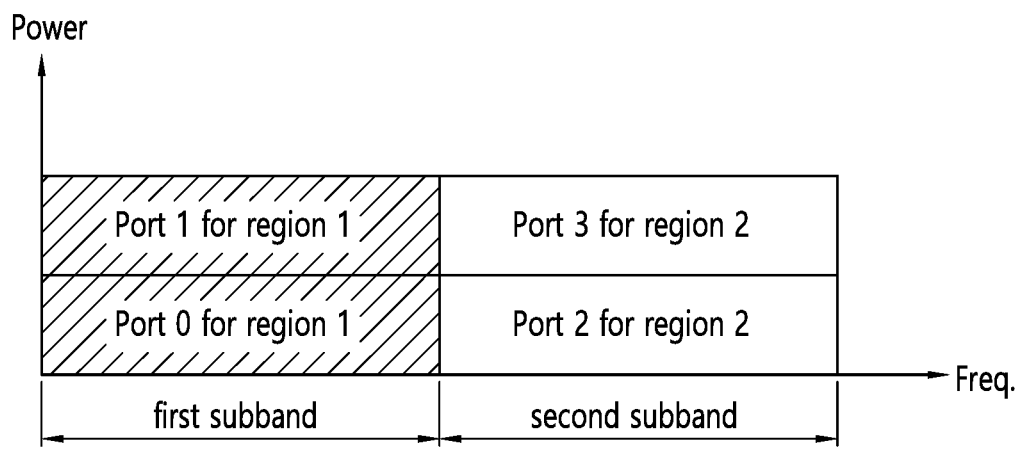
FIG. 12 schematically illustrates an example in which PDSCH1 transmitted to the UE1 and PDSCH2 transmitted to the UE2 are FDM-ed and transmitted.

Hereinafter, a structure in which 256 antenna elements are quartered to form four sub-arrays and a TXRU is connected to the sub-arrays as illustrated in FIGS. 10 to 12 will be described as an example.

When each sub-array includes a total of 64 (8×8) antenna elements in the form of a 2-dimension array, an area corresponding to a horizontal angle region of 15° and a vertical angle region of 15° may be covered by specific analog beamforming. That is, an area to be served by the BS is divided into a plurality of regions and the BS serves one region at a time. In the following description, it is assumed that a CSI-RS antenna fork and a TXRU are mapped in a 1-to-1 manner. Therefore, the antenna port and TXRU have the same meaning in the following description.

FIG. 10 schematically illustrates an example of a service region for each TXRU when all TXRUs have the same analog beamforming direction.

If all TXRUs (antenna ports, sub-arrays) have the same analog beamforming direction as illustrated in FIG. 10, a digital beam having a higher resolution may be formed to increase throughput of the corresponding area. Also, a rank of transmission data to the corresponding area may be increased to increase throughput of the corresponding area.

FIG. 11 schematically illustrates an example of a service region for each TXRU when each TXRU has different analog beamforming directions.

If the TXRUs (antenna port, sub-array) have different analog beamforming directions as illustrated in FIG. 11, data may be simultaneously transmitted in corresponding subframes (SFs) to UEs distributed in a wider region. As illustrated in the figure, two of the four antenna ports may be used for PDSCH transmission to UE1 in region 1 and the remaining two may be used for PDSCH transmission to UE2 in region 2. As in the example of the drawing, two antenna ports, among four antenna ports, may be used for PDSCH transmission to UE1 present in region 1 and the other two antenna ports may be used for PDSCH transmission to UE2.

FIG. 12 schematically illustrates an example in which PDSCH1 transmitted to the UE1 and PDSCH2 transmitted to the UE2 are FDM-ed and transmitted.

Figure 14:
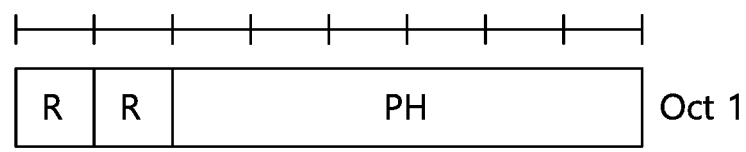
FIG. 14 illustrates an example of a power headroom MAC control element.

FIG. 11 described above illustrates an example in which PDSCH 1 transmitted to UE 1 and PDSCH 2 transmitted to UE 2 are spatial division multiplexed (SDM-ed). In contrast, as illustrated in FIG. 14, the PDSCH1 transmitted to the UE1 and the PDSCH2 transmitted to the UE2 may be FDM-ed and transmitted.

Among a scheme of serving one region using all the antenna ports and a scheme of serving several regions by dividing antenna ports, a preferred scheme is changed according to a RANK and MCS for serving a UE to maximize cell throughput. Also, a preferred scheme may be changed depending on the amount of data to be transmitted to each UE.

The BS calculates a cell throughput or a scheduling metric which may be obtained when one region is served using all the antenna ports and calculates a cell throughput or a scheduling metric which may be obtained when two regions are served by dividing antenna ports. The BS compares the cell throughputs or the scheduling metrics which may be obtained through the respective schemes and select a final transmission scheme. As a result, the number of antenna ports participating in the PDSCH transmission SF-by-SF is changed. CSI feedback from the UE is required in order for the BS to calculate transmission MCSs of the PDSCH according to the number of antenna ports and reflect the calculated transmission MCSs in a scheduling algorithm.

<Phase Noise>

Jitter on a time axis is defined as phase noise on a frequency axis. The phase noise randomly changes a phase of a reception signal of the time axis as follows.

$$r_n = s_n e^{j\phi_n} \text{ where } s_n = \sum_{k=0}^{N-1} d_k e^{j2\pi \frac{kn}{N}} \quad \text{[Equation 1]}$$

In the above equation, $r_n$, $s_n$, $d_k$, $\phi_n$ represent a reception signal, a time axis signal, a frequency axis signal, and a phase rotation value due to phase noise, respectively. When the reception signal undergoes a discrete Fourier transform (DFT), it may be expressed as follows.

$$y_k = d_k \frac{1}{N} \sum_{n=0}^{N-1} e^{j\phi_n} + \frac{1}{N} \sum_{\substack{t=0 \\ t \neq k}}^{N-1} d_t \sum_{n=0}^{N-1} e^{j\phi_n} e^{j2\pi(t-k)n/N} \quad \text{[Equation 2]}$$

In the above equations, $$\frac{1}{N} \sum_{n=0}^{N-1} e^{j\phi_n}, \frac{1}{N} \sum_{\substack{t=0 \\ t \neq k}}^{N-1} d_t \sum_{n=0}^{N-1} e^{j\phi_n} e^{j2\pi(t-k)n/N}$$

represent a common phase error (CPE) and an ICI, respectively. Here, as correlation between the phase noises is greater, the CPE has a larger value.

<PCRS (Phase Compensation Reference Signal) Embodiment>

Figure 13:
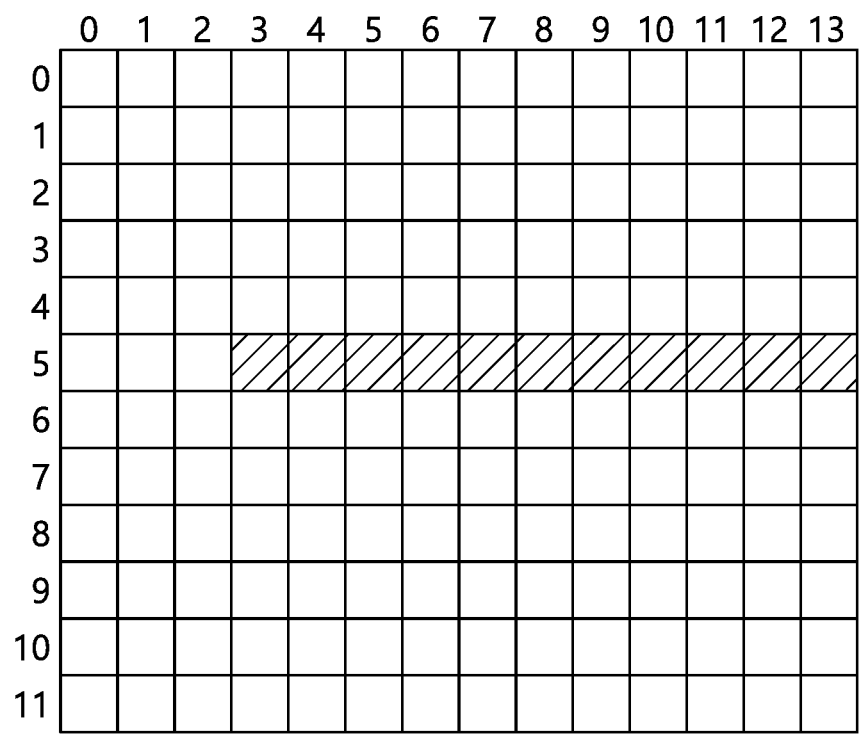
FIG. 13 schematically illustrates an example of a PCRS.
Figure 13:
Figure 13:

FIG. 13 schematically illustrates an example of a PCRS.

In FIG. 13, a PCRS for port 0 is defined in a fifth subcarrier. The PCRS is successively defined in the time axis and thus a phase difference between different time-axis OFDM symbols may be estimated. The remainder excluding demodulation reference signals (DMRS) and the PCRS represents a general PDSCH or a PDCCH.

In the following, power headroom reporting (PHR) will be described.

A power headroom reporting procedure may be used to transmit information regarding a difference between nominal UE maximum transmission power and estimated power for UL-SCH transmission in the unit of activated serving cell and information regarding a difference between nominal UE maximum power and estimated power for UL-SCH transmission and PUCCH transmission on PCell to a serving base station (BS).

<Power Headroom MAC Control Element>

FIG. 14 illustrates an example of a power headroom MAC control element.

Referring to FIG. 14, the power headroom MAC control element is identified by a MAC PDU along with a logical channel ID (LCID). Here, the power headroom MAC control element has a fixed size and consists of a single octet.

In FIG. 14, 'R' field indicates a reserved bit and is set to 0. In addition, 'PH' field indicates power headroom and the PH field indicates a power headroom level. A length of the PH field may have six bits.

<Extended Power Headroom MAC Control Element>

FIG. 15 illustrates an example of an extended power headroom MAC control element.

Referring to FIG. 15, the extended Power Headroom MAC control element is identified by a MAC PDU along with a logical channel ID (LCID). Here, the extended power headroom MAC control element has a variable size.

In FIG. 15, 'Ci' field is a field indicating the presence of a PH field for SCell. When the Ci field is set to 1, the Ci field indicates that the PH field for SCell is reported. If the Ci field is set to 0, the Ci field may indicate that the PH field for SCell is not reported.

'R' field is a reversed bit. Here, the R field may be set to 0.

'V' field indicates whether a PH value is based on actual transmission or reference format. In the case of Type 1 PH, V=0 indicates actual transmission of a PUSCH and V=1 indicates that a PUSCH reference format is used. In the case of Type 2 PH, V=0 indicates actual transmission on the PUCCH and V=1 indicates that a PUCCH reference format is used. Also, in both Type 1 and Type 2 PH, V=0 may indicate the presence of an octet including an associated PCMAX,c field, and V=1 may indicate omission of the octet including the associated PCMAX,c field.

A 'PH' field indicates a power headroom field, and the PH field indicates a power headroom level. A length of the PH field has 6 bits.

A 'P' field indicates whether the UE applies power back-off due to power management.

The 'PCMAX,c' field indicates $\tilde{P}_{CMAX,c}$ used for calculating PCMAX,c or a precoding PH field if the PCMAX,c field is present.

<Power Headroom>

Two types of UE power headroom reports may be defined. A UE power headroom is valid for subframe i for serving cell c.

If a SCG is set for the UE and an higher layer parameter 'phr-ModeOtherCG-r12' for a CG indicates virtual, the UE calculates PH on the assumption that no PUSCH/PUCCH is not transmitted on any serving cell of another CG, regarding power headroom reporting transmitted on the CG.

If the terminal is set to SCG,
 In the case of computing power headroom for cells belonging to the MCG, the term 'serving cell' may refer to a serving cell belonging to the MCG.
 In the case of computing power headroom for cells belonging to the SCG, the term 'serving cell' may refer to a serving cell belonging to the SCG. In addition, the term 'primary cell' may refer to a PSCell of the SCG.
If the terminal is set to PUCCH-SCell,
 In the case of computing power headroom for cells belonging to a primary PUCCH group, the term 'serving cell' may refer to a serving cell belonging to the primary PUCCH group.
 In the case of computing power headroom for cells belonging to the secondary PUCCH group, the term 'serving cell' may refer to a serving cell belonging to the secondary PUCCH group. In addition, the term 'primary cell' may refer to a PUCCH-SCell of the secondary PUCCH group.

Hereinafter, in power headroom reporting, 1. Type 1 report and 2. Type 2 report will be described.

1. Type 1

(1) If a UE transmits a PUSCH without a PUCCH in a subframe i for a serving cell c, power headroom for Type 1 report may be calculated as expressed by Equation 3 below.

$$PH_{type1,c}(i)=P_{CMAX,c}(i)-\{10 \log_{10}(M_{PUSCH,c}(i))+ P_{O\_PUSCH,c}(j)+\alpha_c(j)\cdot PL_c+\Delta_{TF,c}(i)+f_c(i)\} \text{ [dB]} \quad \text{[Equation 3]}$$

Here, $P_{CMAX,c}(i)$ may denote UE transmission power set in subframe i for the serving cell c, and $M_{PUSCH,c}(i)$ may denote a bandwidth of a PUSCH resource allocation represented by the number of resource blocks. $P_{O\_PUSCH,c}(j)$ may denote a parameter configured by the sum of $P_{O\_NOMINAL\_PUSCH,c}(j)$ and $P_{O\_UE\_PUSCH,c}(j)$ components provided in a higher layer.

$\alpha_c(j)$ may be configured as follows.

When the UE is set to higher layer parameter 'UplinkPowerControlDedicated-v12x0' as a parameter for the serving cell c and the subframe i for an uplink power control subframe is set to 2 as indicated by a higher layer parameter 'tpc-SubframeSet-r12', if j=0 or j=1, it may refer to $\alpha_c(j)=\alpha_{c,2}\in\{0, 0.4, 0.5, 0.6, 0.7, 0.8, 0.9, 1\}$ wherein $\alpha_{c,2}$ may refer to a parameter provided from a higher layer for the serving cell c. In the case of j=2, $\alpha_c(j)$ may refer to 1.

In other cases, in the case of j=0 or 1, $\alpha_c \in \{0, 0.4, 0.5, 0.6, 0.7, 0.8, 0.9, 1\}$ may refer to a 3-bit parameter provided from a higher layer for the serving cell c, and in the case of j=2, it may refer to $\alpha_c(j)=1$.

$PL_c$ may refer to a downlink path loss estimate.

$\Delta_{TF,c}(i)$ may be determined by $K_S$ provided to a higher layer for each serving cell c. Here, for $K_S=0$, $\Delta_{TF,c}(i)$ is determined to 0, and for $K_S=1.25$, $\Delta_{TF,c}(i)=10 \log_{10}((2^{BPRE \cdot K_s}-1)\cdot\beta_{offset}^{PUSCH})$ may be determined.

(2) If the UE transmits the PUSCH together with the PUCCH in the subframe i for the serving cell c, power headroom for the Type 1 report may be calculated as expressed by Equation 4 below.

$$PH_{type1,c}(i)=\tilde{P}_{CMAX,c}(i)-\{10 \log_{10}(M_{PUSCH,c}(i))+ P_{O\_PUSCH,c}(j)+\alpha_c(j)\cdot PL_c+\Delta_{TF,c}(i)+f_c(i)\} \text{ [dB]} \quad \text{[Equation 4]}$$

Here, it may be calculated on the assumption that only the PUSCH is transmitted in $\tilde{P}_{CMAX,c}(i)$ subframe i.

(3) (Example of VIRTUAL PHR which will be described later) If the UE does not transmit the PUSCH in the subframe i for the serving cell c, power headroom for the Type 1 report may be calculated as expressed by Equation 5 below.

$$PH_{type1,c}(i)=\tilde{P}_{CMAX,c}(i)-\{P_{O\_PUSCH,c}(1)+\alpha_c(1)\cdot PL_c+f_c(i)\} \text{ [dB]} \quad \text{[Equation 5]}$$

Here, $\tilde{P}_{CMAX,c}(i)$ may be calculated on the assumption that MPR=0 dB, A-MPR=0 dB, P-MPR=0 dB and Tc=0 dB.

2. Type 2

(1) If the UE simultaneously transmits the PUSCH together with the PUCCH in the subframe i for the primary cell, power headroom for the Type 2 report may be calculated as expressed by Equation (6) below.

$$PH_{type2}(i) = P_{CMAX,c}(i) - \quad \text{[Equation 6]}$$

$$10\log_{10}\left(10^{\left(10\log_{10}(M_{PUSCH,c}(i))+P_{O\_PUSCH,c}(j)+\atop \alpha_c(j)\cdot PL_c+\Delta_{TF,c}(i)+f_c(i)\right)/10} + 10^{\left(P_{O\_PUCCH}+PL_c+h(n_{CQI},n_{HARQ},n_{SR})+\atop \Delta_{F\_PUCCH}(F)+\Delta_{TxD}(F')+g(i)\right)/10}\right)_{[dB]}$$

(2) If the UE transmits the PUSCH without PUCCH in the subframe i for the primary cell, power headroom for the type 2 report may be calculated as expressed by Equation (7) below.

$$PH_{type2}(i) = P_{CMAX,c}(i) - \quad \text{[Equation 7]}$$

$$10\log_{10}\left(10^{\left(10\log_{10}(M_{PUSCH,c}(i))+P_{O\_PUSCH,c}(j)+\atop \alpha_c(j)\cdot PL_c+\Delta_{TF,c}(i)+f_c(i)\right)/10} + 10^{(P_{O\_PUCCH}+PL_c+g(i))/10}\right)_{[dB]}$$

(3) If the UE transmits the PUCCH without the PUSCH in the sub-frame i for the primary cell, power headroom for the type-2 report may be calculated as expressed by Equation 8 below.

$$PH_{type2}(i) = P_{CMAX,c}(i) - \quad \text{[Equation 8]}$$

$$10\log_{10}\left(10^{(P_{O\_PUSCH,c}(1)+\alpha_c(1)\cdot PL_c+f_c(i))/10} + 10^{\left(P_{O\_PUCCH}+PL_c+h(n_{CQI},n_{HARQ},n_{SR})+\atop \Delta_{F\_PUCCH}(F)+\Delta_{TxD}(F')+g(i)\right)/10}\right)_{[dB]}$$

(4) (Example of VIRTUAL PHR which will be described later) If the UE does not transmit the PUCCH or the PDCCH in the subframe i for the primary cell, power headroom for the Type 2 report may be expressed by Equation (9) below.

$$PH_{type2}(i) = \tilde{P}_{CMAX,c}(i) - \quad \text{[Equation 9]}$$

$$10\log_{10}\left(10^{(P_{O\_PUSCH,c}(1)+\alpha_c(1)\cdot PL_c+f_c(i))/10} + 10^{(P_{O\_PUCCH}+PL_c+g(i))/10}\right)_{[dB]}$$

Here, $\tilde{P}_{CMAX,c}(i)$ may be calculated on the assumption that MPR=0 dB, A-MPR=0 dB, P-MPR=0 dB and Tc=0 dB.

Hereinafter, the present invention will be described.

The parameters related to power control are specific to the above-described analog beams. That is, parameters related to power control may be determined according to analog beams, and parameters related to power control for a particular analog beam may be distinguished from parameters related to power control for other analog beams.

Thus, since parameters related to power control are analog beam-specific and power headroom reporting is also related to power control, power headroom reporting transmission may also be performed analogue beam-specifically. Here, when the terminal performs transmission of power headroom reporting in an analog beam-specific manner, how to distinguish transmission of power headroom reporting performed by the terminal in an analog beam-specific manner may be problematic.

Thus, the present invention provides a method of transmitting information for identifying a specific analog beam, as well as corresponding power headroom information, when a terminal performs power headroom reporting associated with the specific analog beam.

In addition, when there are multiple power headroom reporting objects associated with a specific analog beam, it may be problematic on which criteria the terminal will perform power headroom reporting associated with the specific analog beam. In other words, when the terminal has a plurality of headroom reports to be transmitted in relation to a specific analog beam, it may be problematic to transmit all the headroom reports in that overhead increases excessively.

Thus, the present invention provides based on which criteria a terminal is to perform power headroom reporting associated with a specific analog beam.

The proposed methods below propose methods for effectively performing "POWER HEADROOM REPORTING (PHR)" when a UE (simultaneously) operates a plurality of predetermined (/signaled) "UL POWER CONTROL PROCESS (UL PC PROCESS)" in a NEW RAT (NR) system. In the present invention, for example, wording "analog beam" may extendedly interpreted as "(digital) beam (index)" and/or "reference signal resource (interworking with (beam (index)) (e.g., antenna port, LAYER index, (time/frequency) resource pattern, etc.) (index)" and/or "(virtual) cell (identifier (/index))", etc.

Here, for example, different analog beams (or BEAM REFERENCE SIGNAL (BRS) IDs) may interwork for each UL PC PROCESS. In a specific example, based on the K number of higher BEAM REFERENCE SIGNAL RECEIVED POWER (BRSRP) information that the UE has previously measured/reported, a base station (BS) sets (/signals) (M number of) UL PC PROCESS interworking with M number of (e.g., "K≤M") analog beam (or BRS ID) (Or M) UL PC PROCESS (interworking) with a specific analog beams (or BRS IDs), and the BS schedules (/triggers) UL PC PROCESS-based uplink channel/signal transmission (e.g., PUSCH/PUCCH/SRS) interworking with a specific analog beam (or BRS ID) to the UE through predefined (physical layer) signaling.

Here, for example, a PATHLOSS (PL) value related to a specific UL PC PROCESS may be performed through a BRS measurement interworking with the corresponding UL PC PROCESS.

Here, for example, an interference pattern (/intensity) experienced by different BRS-based uplink channel/signal transmission and a channel state (on a frequency/time domain) may not be the same. Thus, for example, an independent (or separate) TRANSMIT POWER CONTROL (TPC) ACCUMULATION operation (and/or power control parameter information (e.g., "P_O", "ALPHA", etc.)) may be set (/signaled) for each UL PCE PROCESS.

Here, for example, (a plurality of) analog beams (or BRS IDs) associated with a plurality of UL PC processes set (/signaled) to the UE may be analog beams of different (or the same) TRANSMISSION & RECEPTION POINT (TRP) (or physical cell) (to which UL COMP operation is applied).

Prior to describing the proposed methods, a PHR operation in the (existing) LTE system is as described above.

Here, for example, for the purposes of description, (A) information calculated/reported (as a predefined (/signaled) event (/condition) is satisfied) when uplink channel/signal (e.g., PUSCH/PUCCH) transmission is not actually performed (/scheduled) will be referred to as "VIRTUAL PHR", and (B) information calculated/reported (as the predefined (/signaled) event (/condition) is satisfied) when uplink channel/signal transmission is actually performed (/scheduled) will be referred to as "ACTUAL PHR".

[Proposed Method] The UE may be allowed to perform the PHR operation according to (some or all of) rules below, for example. Here, in describing the rules, for example, it is assumed that different analog beams (or BRS IDs) interwork for each UL PC process, unless otherwise mentioned.

Figure 16:
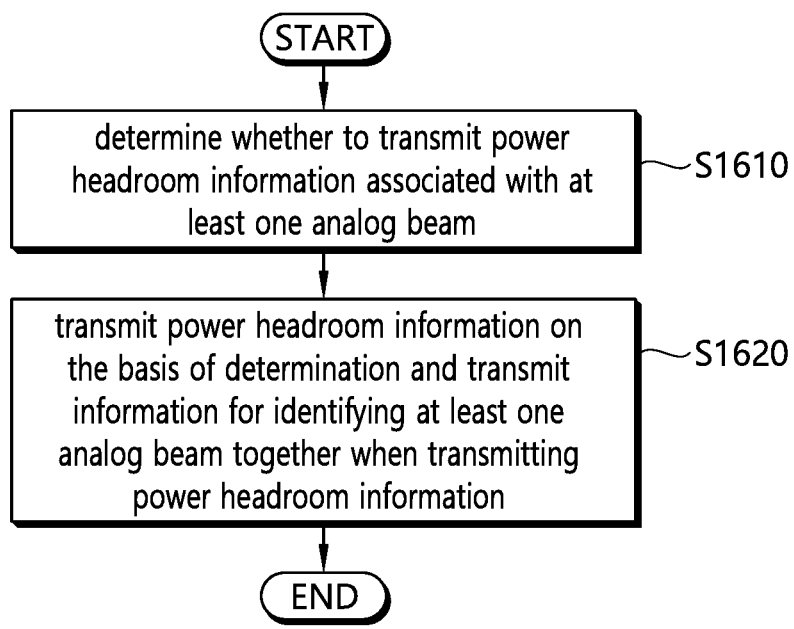
FIG. 16 is a flowchart illustrating a method of transmitting power headroom information according to an embodiment of the present invention.

FIG. 16 is a flowchart illustrating a method of transmitting power headroom information according to an embodiment of the present invention.

Referring to FIG. 16, the UE determines whether to transmit power headroom information associated with at least one analog beam (S1610). Here, details of the analog beam are as described above, and details of the power headroom information are also as described above.

Thereafter, the UE transmits the power headroom information based on the determination, and here, when transmitting the power headroom information, the UE may transmit information for identifying at least one analog beam together (S1620). Here, for example, when transmitting the power headroom information, the UE may transmit information about a maximum transmission power value allowed for the at least one analog beam. Also for example, the UE may receive information indicating the number of pieces of simultaneously reported power headroom information. Also, for example, when the UE simultaneously transmits pieces of the power headroom information respectively related to a plurality of analog beams, the UE may transmit some of pieces of the power headroom information respectively related to the plurality of analog beams on the basis of the information indicating the number of pieces of simultaneously reported power headroom information. Also, for example, the some of pieces of the power headroom information may be determined on the basis of the information identifying the plurality of analog beams. Also, for example, the some of pieces of the power headroom information may include only pieces of the power headroom information transmitted when uplink channel transmission is actually performed. Also, for example, if the number of pieces of the power headroom information related to the plurality of analog beams, respectively, is greater than the number indicated by the information indicating the number of the pieces of simultaneously reported power headroom information, the UE may transmit the some of pieces of the power headroom information. Also, for example, when the UE simultaneously transmits the pieces of the power headroom information respectively related to the plurality of analog beams, a quantization step size of power headroom information related to a specific analog beam among the plurality of analog beams may be different from a quantization step size of power headroom information related to another analog beam among the plurality of analog beams. Also, for example, when an analog beam list is changed, the UE may transmit power headroom information related to the at least one analog beam. Also, for example, the power headroom information may be power headroom information transmitted when uplink channel transmission is actually performed or power headroom information transmitted when uplink channel transmission is not actually performed.

Hereinafter, a specific example in which the UE transmits power headroom information according to FIG. 16 will be described.

As described above, when transmitting the power headroom information, the UE may transmit information about a maximum transmission power value allowed for the at least one analog beam. A specific example thereof is as follows.

(Rule #1-A) For example, when performing a UL PC PROCESS PHR interworking with a specific analog beam (or BRS ID), (corresponding) ID information (or UL PC PROCESS INDEX information) (as well as the POWER HEADROOM (PH) PC PROCESS INDEX information), may be reported. Here, for example, when performing a plurality of UL PC PROCESS PHRs related to the same (physical) cell (or TRP), information of P_CMAX,C (Here, C value indicates a cell (/TRP) index) may be reported only one time (overhead reduction effect).

Here, for example, if the UE simultaneously performs uplink channel/signal transmission based on a plurality of analog beams (or BRS IDs) and a maximum allowable transmission power value (P_CMAX,C,B (here, B value indicates the analog beam index (/BRSID)) for each analog beam (or BRS ID) is previously set (/signaled), P_CMAX, C,B information (as well as PH information) may be reported when the UL PC PROCESS PHR interworking with the specific analog beam is performed.

As described above, the UE may receive information indicating the number of pieces of simultaneously reported power headroom information. Here, when the UE simultaneously transmits pieces of the power headroom information respectively related to the plurality of analog beams, the UE may transmit some of pieces of the power headroom information respectively related to the plurality of analog beams on the basis of the information indicating the pieces of simultaneously reported power headroom information. Here, the some of pieces of the power headroom information may be determined on the basis of information identifying the plurality of analog beams. Here, the some of pieces of the power headroom information may include only pieces of the power headroom information transmitted when uplink channel transmission is actually performed. Here, if the number of pieces of the power headroom information respectively related to the plurality of analog beams is greater than the number indicated by the information indicating the number of pieces of simultaneously reported power headroom information, the UE may transmit the some of pieces of the power headroom information. Also, specific examples thereof are as follows.

(Rule #1-B) For example, when PHR is performed (as a predefined (/signaled) event (/condition) is satisfied), the number of simultaneously reported UL PC PROCESS PHR (NUM_PHR) may be previously set (/signaled) (from the BS).

Here, for example, the BS may (dynamically) provide information regarding (A) whether PHR is indicated and/or (B) information regarding NUM_PHR, or the like, through a specific field(s) on a predefined (/signaled) DCI FORMAT.

Here, for example, the UE may request PHR related resource allocation as necessary (e.g., when uplink channel/signal transmission fails continuously) through a preset (/signaled) channel/signal (e.g., through SCHEDULING REQUEST (SR)).

Here, for example, the NUM_PHR value may be set (/assumed) (always) equal to the entire number of set (/signaled) UL PC PROCESS (NUM_PRO) set (/signaled) for the UE or may be set (/signaled) as a smaller value.

Here, for example, if NUM_PHR is smaller than NUM_PRO, (OPTION #1-B-1) NUM_PHR number is selected in ascending order (or descending order) of UL PC PROCESS INDEX (or BRS ID associated with UL PC PROCESS) and reported and/or (OPTION #1-B-2) in case where carrier aggregation (CA) is applied, NUM_PHR number is selected in ascending order (or descending order) of CELL INDEX (/ID) (associated with UL PC PROCESS) and reported and/or (OPTION #1-B-3) information regarding UL PC PROCESS associated with previously (BRSRP) measured/reported higher (or lower) NUM_PHR number of BRS IDs is reported and/or (OPTION #1-B-4) ACTUAL PHR-available UL PC PROCESS may be selected/reported by priority higher (or lower) than UL PC PROCESS of VIRTUAL PHR (e.g., OPTION #1-B-1)/(OPTION #1-B-2)/(OPTION #1-B-3) may be applied to the same PHR forms to use tie-breaking).

Here, for example, among the NUM_PHR number of UL PC processes selected according to the rule, only a UL PC process available for ACTUAL PHR form may be (finally) reported (e.g., it can be interpreted that VIRTUAL PHR form is omitted).

Here, for example, only the minimum value (or the maximum value) (or the (entire) average value) among the NUM_PHR number of UL PC PROCESS related pieces of PH information selected according to the rule may be reported (finally) as a representative value. For example, the number of VIRTUAL PHRs reported together with (ACTUAL PHR) may be set (/signaled) to be different according to (different UL PC PROCESS-based) uplink channel/signal number (NUM_SIUL) (actually) scheduled at the time of performing PHR.

Here, for example, when NUM_SIUL is smaller than a preset (/signaled) threshold value (e.g., "2"), a relatively large number (or a small number) of VIRTUAL PHRs may be performed.

For example, it may be set (/signaled) such that the UE reports the PH information for the scheduled (or indicated) analog beam (or BRS ID) (-related UL PC PROCESS) in an ACTUAL PHR form and reports the PH information regarding remaining analog beam (or BRS ID) (-related UL PC PROCESS) in a VIRTUAL PHR form.

For example, in the case of (exceptionally) reporting PH information related to a single analog beam (or BRS ID) (-related UL PC PROCESS), it may be assumed that, in calculating the corresponding PH information, a preset (/signaled) specific analog beam (pattern) (or BRS ID) (e.g., corresponding specific analog beam (or BRS ID) is an analog beam (pattern) (or BRS ID) at a timing when the UE reports the (corresponding) PH information.

(Rule #1-C) For example, when the UE simultaneously reports a plurality of pieces of preset (/signaled) UL PC PROCESS PH information (See (Rule #1-B)), the UE may assume (A) a lowest (or highest or set (/signaled) (from the BS) UL PC PROCESS INDEX-related PH information, or (B) UL PC PROCESS-related PH information associated with a lowest (or highest or set (/signaled) (from the BS), or (C) UL PC PROCESS-related PH information associated with an analog beam (or BRS ID) of a higher (or lower) Qth BRSRP of (previously measured/reported) highest (or lowest or set (/signaled) (from the BS), or (D) UL PC PROCESS-related PH information set (/signaled) as REFERENCE of PL measurement, among (simultaneously reported) UL PC PROCESS, as (PH) REFERENCE value (REFER_PH), and reports a difference value (DETLA) compared with the REFER_PH for the other remaining UL PC PROCESS-related PH information.

Here, for example, when such a rule is applied, overhead related to PH information reporting may be reduced.

As described above, when the UE simultaneously transmits the pieces of the power headroom information respectively related to the plurality of analog beams, a quantization step size of power headroom information related to a specific analog beam among the plurality of analog beams may be different from a quantization step size of power headroom information related to another analog beam among the plurality of analog beams. Also, a specific example thereof is as follows.

(Rule #1-D) For example, (in order to reduce overhead related to PH information reporting), a specific UL PC PROCESS-related PH LEVEL QUANTIZATION STEP SIZE (PH_QSZ) (compared to other UL PC PROCESS reported simultaneously) may be set (/signaled) to be different.

Here, for example, among the (simultaneously reported) UL PC PROCESS, a PH_QSZ value related to (A) a UL PC PROCESS of a lowest (or highest or set (/signaled) (from the BS) index, or (B) a UL PC PROCESS associated with a lowest (or highest or set (/signaled) (from the BS) BRS ID, or (C) a UL PC PROCESS associated with analog beam (or BRS ID) of higher (or lower) Qth (or W number of) BRSRP (previously measured/reported) highest (or lowest or set/(signaled) (from the BS), or (D) a UL PC PROCESS set (/signaled) as reference of PL measurement is set (/signaled) to be (relatively) fine (or coarse) (or in the same manner as the conventional one), and a PH-QSZ value related to the other remaining UL PC PROCESS.

(Rule #1-E) For example, when PHR is performed (as a predefined (/signaled) event (/condition) is satisfied), (A) whether to simultaneously report PUSCH PH information and PUCCH PH information (which are independently calculated) or (B) whether to report only the PUSCH PH (or PUCCH PH) information may be previously set (/signaled). Here, for example, such a rule may be useful when a PUSCH transmission resource and a PUCCH transmission resource are time division multiplexed (TDM-ed) (within one transmission time interval (TTI)) and/or when PUCCH uplink control information (UCI) transmission is performed (/scheduled) on the basis of (relatively) high MCS (e.g., 16/64 QAM) (which may be interpreted as a case where an error occurrence probability is sensitively changed according to an uplink transmission power set value).

Here, for example, (when PUSCH transmission resource and PUCCH transmission resource are TDM-ed and simultaneous reporting of PUSCH/PUCCH PH information is set (/signaled), (A) if it is previously set (/signaled) that PUCCH PH information is (always) reported in a VIRTUAL PHR form or in an ACTUAL PHR form (according to scheduling) or (B) if PUSCH transmission and PUCCH transmission are performed (/scheduled) within a preset (/signaled) TIME WINDOW (e.g., SINGLE TTI (SELF-CONTAINED FRAME STRUCTURE)), (independently calculated) PUSCH/PUCCH ACTUAL PH information is simultaneously reported, or otherwise, (independently calculated) PUSCH ACTUAL PH information and PUCCH VIRTUAL PH information (or PUCCH ACTUAL PH information based on most recently (actually) performed PUCCH transmission) may be simultaneously reported.

Here, for example, when the PUSCH transmission resource and the PUCCH transmission resource are FREQUENCY DIVISION MULTIPLEXED (FDM-ED), whether to report only PUSCH PH information or whether to report PUCCH/PUSCH PH information (considered/calculated together) may be determined according to whether simultaneous transmission of PUCCH/PUSCH has been set (/signaled) (or whether PUCCH/PUSCH transmission times overlap (partially or entirely) (in the same manner as the existing LTE PHR operation (See the contents regarding power headroom described above).

(Rule #1-F) For example, NUMEROLOGY (e.g., TTI LENGTH, SUB-CARRIER SPACING, SERVICE TYPE, LATENCY/QOS REQUIREMENT, etc.) may not be the same between cells set by a carrier aggregation technique.

Here, for example, in order to lower the (UE) complexity of the PH information calculation/reporting related to a plurality of (different NUMEROLOGY) cells, whether to report specific cell (and/or specific UL PC PROCESS)-related PH information (always) in the VIRTUAL PHR form or ACTUAL PHR form (according to scheduling) may be previously set (/signaled).

(Rule #1-G) For example, a PHR triggering related timer (e.g., PROHIBITPHR-TIMER, PERIODICPHR-TIMER) operation (START/RESET) may be set (/signaled) to be operated (/applied) commonly or independently (useful when independently scheduling is performed for each analog beam (or BRS ID) between the same (physical) cell (or TRP)-related) UL PC PROCESS (or analog beams (or BRS IDs) associated with the UL PC PROCESS).

Here, for example, when a timer related to a specific UL PC PROCESS (or an analog beam (or BRS ID) associated with a UL PC PROCESS) has expired, a plurality of pieces of preset (/signaled) UL PC PROCESS-related PH information may be simultaneously reported or only UL PC PROCESS-related PH information for which the time has expired may be reported.

As described above, when the analog beam list is changed, the UE may transmit power headroom information related to the at least one analog beam. A specific example thereof may be as follows.

(Rule #1-H) For example, if the following (some) conditions (in addition to the existing PHR triggering condition (/event) (See the contents regarding power headroom described above) are satisfied, PHR operation (of the preset (/signaled) number of UL PC PROCESS) may be performed.

(Example #1-H-1) Case where a list of K number of higher analog beams (or BRS IDs) (based on BRSRP) is (partially or entirely) (re)changed (e.g., case where the best analog beam (or BRS ID) is (re)changed)

(Example #1-H-2) Case where (some or all of) PL values related to the K number of higher analog beams (or BRS IDs) (BRSRP measured/reported previously by the UE) is significantly changed to be greater than a preset (/signaled) threshold value (e.g., which may be interpreted as a case where (some or all of) PL values related to UL PC PROCESS is significantly changed to be greater than the preset (/signaled) threshold value when each (corresponding) analog beam (or BRS ID) is associated with different UL PC PROCESS).

(Example #1-H-3) Case where UL PC PROCESS setting information (e.g., UL PC PROCESS number, (some or all of) analog beams (or BRS IDs) associated with UL PC PROCESS, etc.) are (re)changed (Example #1-H-4) Case where the BS (re-)changes (some or all of) pieces of analog beam (or BRS ID) information (e.g., analog beam (or BRS ID) adding/deleting operation)

For example, coverage of the system to which the proposed method of the present invention is applied may be extended to other systems besides the 3GPP LTE system.

In addition, it is obvious that the examples of the proposed method described above may also be included as one of the implementation methods of the present invention and thus may be considered as a kind of proposed methods. In addition, the proposed methods described above may be implemented independently or may be implemented as a combination (or merging) of some of the proposed methods.

For example, for the convenience of understanding, the above-described embodiment may be schematized in a view point that 'the UE transmits information for identifying analog beams' as follows.

Figure 17:
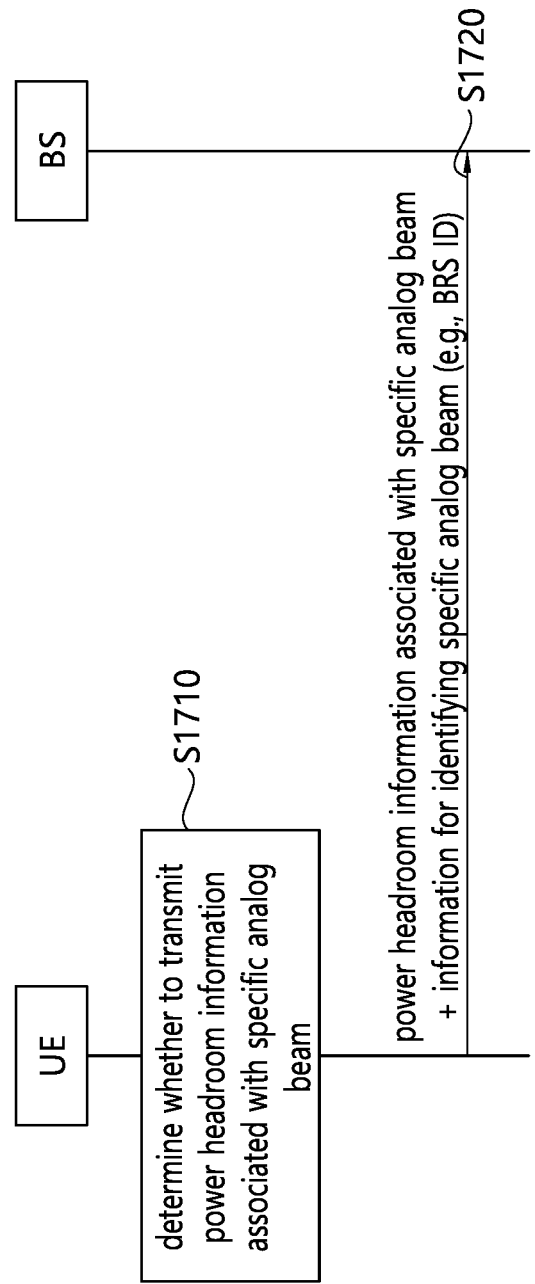
FIG. 17 is a flowchart illustrating a method of transmitting power headroom information according to another embodiment of the present invention.

FIG. 17 is a flowchart illustrating a method of transmitting power headroom information according to another embodiment of the present invention.

Referring to FIG. 17, the UE may determine whether to transmit power headroom information associated with a specific analog beam (S1710).

The UE transmits the power headroom information associated with the specific analog beam and information (e.g., BRS ID) for identifying the specific analog beam to the BS (S1720). Here, for example, when transmitting the power headroom information, the UE may transmit information about a maximum transmission power value allowed for the at least one analog beam. Also for example, the UE may receive information indicating the number of pieces of simultaneously reported power headroom information. Also, for example, when the UE simultaneously transmits pieces of the power headroom information respectively related to a plurality of analog beams, the UE may transmit some of pieces of the power headroom information respectively related to the plurality of analog beams on the basis of the information indicating the number of pieces of simultaneously reported power headroom information. Also, for example, the some of pieces of the power headroom information may be determined on the basis of the information identifying the plurality of analog beams. Also, for example, the some of pieces of the power headroom information may include only pieces of the power headroom information transmitted when uplink channel transmission is actually performed. Also, for example, if the number of pieces of the power headroom information related to the plurality of analog beams, respectively, is greater than the number indicated by the information indicating the number of the pieces of simultaneously reported power headroom information, the UE may transmit the some of pieces of the power headroom information. Also, for example, when the UE simultaneously transmits the pieces of the power headroom information respectively related to the plurality of analog beams, a quantization step size of power headroom information related to a specific analog beam among the plurality of analog beams may be different from a quantization step size of power headroom information related to another analog beam among the plurality of analog beams. Also, for example, when an analog beam list is changed, the UE may transmit power headroom information related to the at least one analog beam. Also, for example, the power headroom information may be power headroom information transmitted when uplink channel transmission is actually performed or power headroom information transmitted when uplink channel transmission is not actually performed.

Here, a specific example in which the UE transmits the power headroom information associated with the specific analog beam and the information for identifying the specific analog beam to the BS is as described above, and thus, a duplicate example will be omitted.

For example, for the convenience of understanding, the above-described embodiment may be schematized in a view point that 'which power headroom information is to be transmitted when the UE performs power headroom reporting' as follows.

Figure 18:
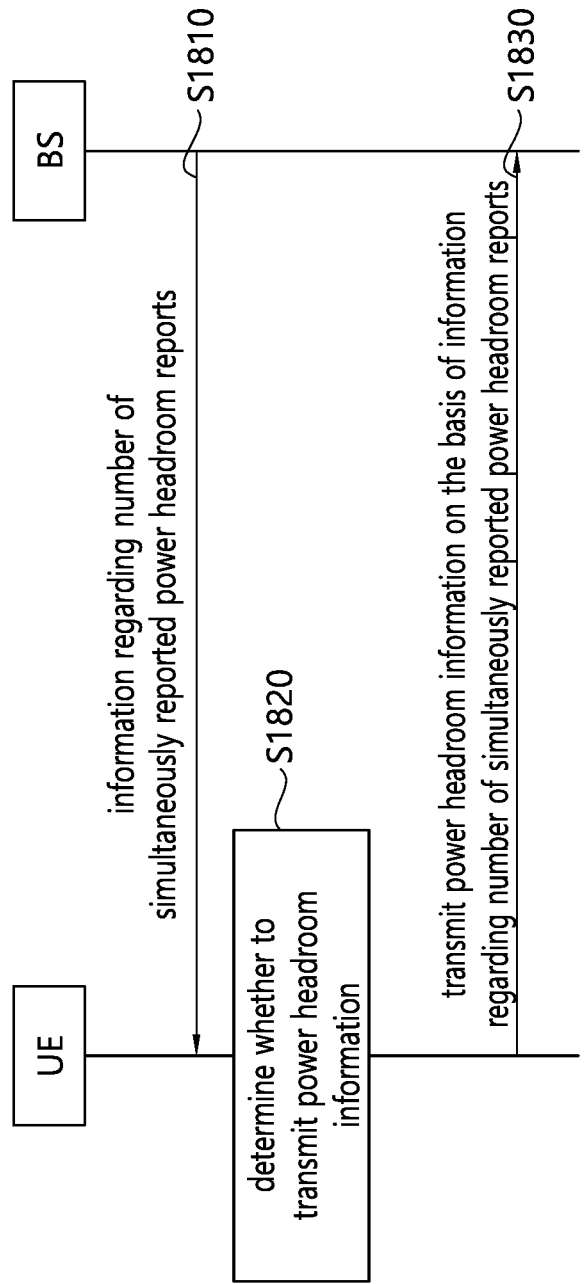
FIG. 18 is a flowchart illustrating a method of transmitting power headroom information according to another embodiment of the present invention.

FIG. 18 is a flowchart illustrating a method of transmitting power headroom information according to another embodiment of the present invention.

According to FIG. 18, the UE may receive information on the number of simultaneously reported power headroom reports from the BS. That is, the UE may set the number of power headroom reports that the UE may simultaneously report by the BS. Here, a specific example in which the number of pieces of power headroom that the UE may simultaneously report is indicated by the base station is as described above, so a duplicate example will be omitted.

Thereafter, the UE may determine whether to transmit the power headroom information (S1820).

The UE may transmit the power headroom information to the base station on the basis of the information on the number of simultaneously reported power headroom reports (S1830). Here, for example, when transmitting the power headroom information, the UE may transmit information about a maximum transmission power value allowed for the at least one analog beam. Also for example, the UE may receive information indicating the number of pieces of simultaneously reported power headroom information. Also, for example, when the UE simultaneously transmits pieces of the power headroom information respectively related to a plurality of analog beams, the UE may transmit some of pieces of the power headroom information respectively related to the plurality of analog beams on the basis of the information indicating the number of pieces of simultaneously reported power headroom information. Also, for example, the some of pieces of the power headroom information may be determined on the basis of the information identifying the plurality of analog beams. Also, for example, the some of pieces of the power headroom information may include only pieces of the power headroom information transmitted when uplink channel transmission is actually performed. Also, for example, if the number of pieces of the power headroom information related to the plurality of analog beams, respectively, is greater than the number indicated by the information indicating the number of the pieces of simultaneously reported power headroom information, the UE may transmit the some of pieces of the power headroom information. Also, for example, when the UE simultaneously transmits the pieces of the power headroom information respectively related to the plurality of analog beams, a quantization step size of power headroom information related to a specific analog beam among the plurality of analog beams may be different from a quantization step size of power headroom information related to another analog beam among the plurality of analog beams. Also, for example, when an analog beam list is changed, the UE may transmit power headroom information related to the at least one analog beam. Also, for example, the power headroom information may be power headroom information transmitted when uplink channel transmission is actually performed or power headroom information transmitted when uplink channel transmission is not actually performed.

Here, since a specific example in which the UE transmits the power headroom information to the BS is as described above, and thus, a duplicate example will be omitted.

In addition, in this drawing and specification, for the convenience of understanding, the step (S1820) of determining whether the UE transmits power headroom information and the step (S1830) of transmitting the power headroom information to the base station by the UE are separately displayed, but both steps may be merged into a single process.

For example, as described above, the above-described embodiments may be merged to each other. For the convenience of understanding, among the above-described embodiments, the 'view point that the UE transmits the information for identifying the analog beams' and the 'view point that which of pieces of the power headroom information is to be transmitted when the UE performs power headroom reporting may be combined and described with reference to the accompanying drawing as follows.

Figure 19:
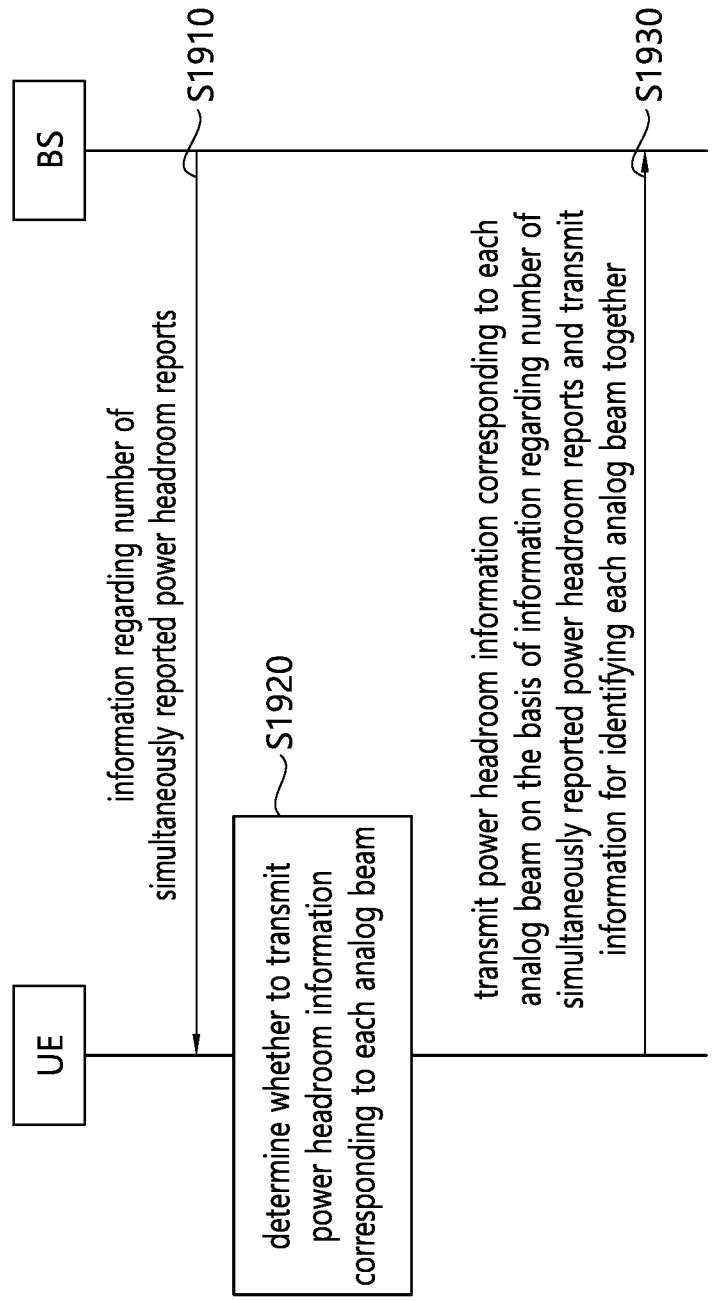
FIG. 19 is a flowchart illustrating a method of transmitting power headroom information according to another embodiment of the present invention.

FIG. 19 is a flowchart illustrating a method of transmitting power headroom information according to another embodiment of the present invention.

Referring to FIG. 19, the UE may receive information on the number of simultaneously reported power headroom reports from the BS. That is, the UE may be set the number of pieces of the power headroom reports that the UE may simultaneously report from the BS. Here, a specific example in which the UE is indicated the number of pieces of the power headroom that the UE may simultaneously report from the BS is as described above, and thus, a duplicate example will be omitted.

Thereafter, the UE may determine whether to transmit POWER HEADROOM information corresponding to each analog beam (S1920).

The UE may transmit power headroom information corresponding to each of the analog beams on the basis of the information on the number of pieces of simultaneously reported power headroom reports, together with information for identifying each of the analog beams (S1930). Here, for example, when transmitting the power headroom information, the UE may transmit information about a maximum transmission power value allowed for the at least one analog beam. Also for example, the UE may receive information indicating the number of pieces of simultaneously reported power headroom information. Also, for example, when the UE simultaneously transmits pieces of the power headroom information respectively related to a plurality of analog beams, the UE may transmit some of pieces of the power headroom information respectively related to the plurality of analog beams on the basis of the information indicating the number of pieces of simultaneously reported power headroom information. Also, for example, the some of pieces of the power headroom information may be determined on the basis of the information identifying the plurality of analog beams. Also, for example, the some of pieces of the power headroom information may include only pieces of the power headroom information transmitted when uplink channel transmission is actually performed. Also, for example, if the number of pieces of the power headroom information related to the plurality of analog beams, respectively, is greater than the number indicated by the information indicating the number of the pieces of simultaneously reported power headroom information, the UE may transmit the some of pieces of the power headroom information. Also, for example, when the UE simultaneously transmits the pieces of the power headroom information respectively related to the plurality of analog beams, a quantization step size of power headroom information related to a specific analog beam among the plurality of analog beams may be different from a quantization step size of power headroom information related to another analog beam among the plurality of analog beams. Also, for example, when an analog beam list is changed, the UE may transmit power headroom information related to the at least one analog beam. Also, for example, the power headroom information may be power headroom information transmitted when uplink channel transmission is actually performed or power headroom information transmitted when uplink channel transmission is not actually performed.

Here, a specific example in which the UE transmits the power headroom information to the BS is as described above, so a duplicate example will be omitted.

In addition, for the convenience of understanding, the step of determining whether the UE transmits power headroom information (S1920) and the step of transmitting the power headroom information by the UE to the BS (S1930) are separately displayed, but both steps may be merged into a single step.

Although not shown, the following example may be further applied to the embodiments described above.

As described above, power headroom may refer to a difference between maximum transmission power of the UE and data transmission power (e.g., PUSCH power). In other words, information on the power headroom may refer to information on extra transmission power. Here, the UE in the embodiment of the present invention may transmit information on the extra transmission power regarding the analog beams in addition to (or in place of) the above-described power headroom value. Here, the extra transmission power for the analog beam may refer to a 'power headroom for an analog beam' which is identified separately from the above-mentioned power headroom.

Here, the power headroom for the analog beam may refer to information on extra power for each of the analog beams (or information on extra power for the entire analog beams).

For example, when the UE transmits power headroom for each of the plurality of analog beams, the UE may determine a difference (value) between maximum power that the UE may transmit to correspond to each analog beam and transmission power of data that the UE transmits to correspond to each analog beam as power headroom for each analog beam, and thereafter, when transmitting the power headroom, the UE may transmit the power headroom(s) corresponding to each analog beam. Here, when transmitting the power headroom(s) corresponding to each analog beam, the UE may also transmit an identifier identifying each analog beam in the above-mentioned described, and hereinafter, additional description of the same contents as those described above will be omitted to avoid duplicate description.

Figure 20:
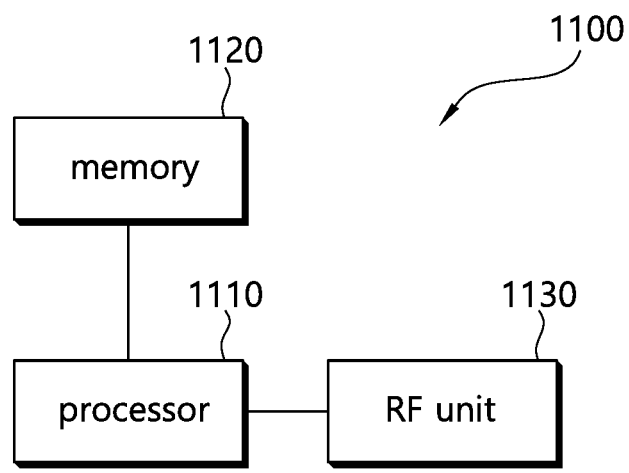
FIG. 20 is a block diagram illustrating a UE in which an embodiment of the present invention is implemented.

FIG. 20 is a block diagram illustrating a UE in which an embodiment of the present invention is implemented.

Referring to FIG. 20, a UE 1100 includes a processor 1110, a memory 1120, and a radio frequency (RF) unit 1130.

According to an embodiment, the processor 1110 may perform the functions/operations/methods described in the present invention. For example, the processor 1110 may be configured to determine whether to transmit power headroom information related to at least one analog beam. Also, the processor 1110 is configured to transmit the power headroom information on the basis of the determination, and when the processor 1110 transmits the power headroom information, the processor may transmit information for identifying the at least one analog beam together.

The RF unit 1130 is connected to the processor 1110 to transmit and receive a wireless signal.

The processor may include application-specific integrated circuits (ASICs), other chipsets, logic circuits, and/or data processors. The memory may include read-only memory (ROM), random access memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be present within or outside the processor and connected to the processor using a well-known means.

What is claimed is:

1. A method for power headroom reporting performed by a user equipment (UE) in a wireless communication system, the method comprising:
   receiving information informing the UE about a number of pieces of simultaneously reported power headroom information; and
   transmitting power headroom information related to at least one analog beam based on the received information,
   wherein, when transmitting the power headroom information, the UE also transmits information for identifying the at least one analog beam,
   wherein, when the UE simultaneously transmits a plurality of pieces of the power headroom information respectively related to a plurality of analog beams, the UE transmits the plurality of pieces of the power headroom information respectively related to the plurality of analog beams on the basis of the information indicating the number of pieces of the simultaneously reported power headroom information.

2. The method of claim 1, wherein
   when transmitting the power headroom information, the UE transmits information on a maximum transmission power value allowed for the at least one analog beam together.

3. The method of claim 1, wherein the plurality of the pieces of the power headroom information are determined on the basis of information for identifying the plurality of analog beams.

4. The method of claim 1, wherein the plurality of the pieces of the power headroom information include only pieces of the power headroom information transmitted when uplink channel transmission is actually performed.

5. The method of claim 1, wherein
   when the number of pieces of the power headroom information respectively related to the plurality of analog beams is greater than the number indicated by the information indicating the number of pieces of simultaneously transmitted power headroom information, the UE transmits the plurality of the pieces of the power headroom information.

6. The method of claim 1, wherein when the UE simultaneously transmits the pieces of the power headroom information respectively related to the plurality of analog beams, a quantization step size of power headroom information related to a specific analog beam among the plurality of analog beams is different from a quantization step size of power headroom information related to another analog beam among the plurality of analog beams.

7. The method of claim 1, wherein
   when an analog beam list is changed, the UE transmits power headroom information related to the at least one analog beam.

8. The method of claim 1, wherein
   the power headroom information is power headroom information transmitted when uplink channel transmission is actually performed or power headroom information transmitted when uplink channel transmission is not actually performed.

9. A user equipment comprising:
   a transceiver transmitting and receiving a wireless signal; and a processor operatively connected to the transceiver, wherein the processor is configured to:

control the transceiver to receive information informing the UE about a number of pieces of simultaneously reported power headroom information; and control the transceiver to transmit power headroom information related to at least one analog beam based on the received information, wherein, when transmitting the power headroom information, the UE also transmits information for identifying the at least one analog beam, wherein, when the UE simultaneously transmits a plurality of pieces of the power headroom information respectively related to a plurality of analog beams, the UE transmits the plurality of pieces of the power headroom information respectively related to the plurality of analog beams on the basis of the information indicating the number of pieces of the simultaneously reported power headroom information.

* * * * *